US011463146B2

United States Patent
Nilsson et al.

(10) Patent No.: US 11,463,146 B2
(45) Date of Patent: Oct. 4, 2022

(54) METHODS AND APPARATUSES FOR SELECTING THE BEST TRANSMIT BEAMS

(71) Applicant: Telefonaktiebolaget LM Ericsson (publ), Stockholm (SE)

(72) Inventors: Andreas Nilsson, Gothenburg (SE); Sebastian Faxér, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/421,872

(22) PCT Filed: Nov. 21, 2019

(86) PCT No.: PCT/EP2019/082167
§ 371 (c)(1),
(2) Date: Jul. 9, 2021

(87) PCT Pub. No.: WO2020/143946
PCT Pub. Date: Jul. 16, 2020

(65) Prior Publication Data
US 2022/0109483 A1     Apr. 7, 2022

Related U.S. Application Data

(60) Provisional application No. 62/790,704, filed on Jan. 10, 2019.

(51) Int. Cl.
*H04B 7/04* (2017.01)
*H04B 7/06* (2006.01)
(Continued)

(52) U.S. Cl.
CPC ......... *H04B 7/0639* (2013.01); *H04B 7/0404* (2013.01); *H04L 5/0051* (2013.01); *H04L 5/0073* (2013.01)

(58) Field of Classification Search
CPC .......... H04B 7/00; H04B 7/04; H04B 7/0404; H04B 7/0408; H04B 7/0413;
(Continued)

(56) References Cited

U.S. PATENT DOCUMENTS

2014/0146782 A1    5/2014  Gerlach et al.
2017/0311187 A1   10/2017  Dong et al.
(Continued)

FOREIGN PATENT DOCUMENTS

WO    2018/222931 A1   12/2018

OTHER PUBLICATIONS

International Search Report and Written Opinion issued in International Application No. PCT/EP2019/082167 dated Jan. 30, 2020 (11 pages).
(Continued)

*Primary Examiner* — Siu M Lee
(74) *Attorney, Agent, or Firm* — Rothwell, Figg, Ernst & Manbeck, P.C.

(57) ABSTRACT

A method for selecting one or more TX beams to identify in a beam report. The method includes a UE obtaining i) a first interference value, $1a$, associated with a first antenna arrangement and ii) a second interference value, $1b$, associated with a second antenna arrangement. The method also includes the UE obtaining i) a power value, $P1a$, associated with the first antenna arrangement and with a first TRP TX beam and ii) a power value, $P1b$, associated with the second antenna arrangement and with the first TRP TX beam. The method further includes the UE determining a first final power value, $Pn1$, based on $1a$ and $1b$ and based on at least one of $P1a$, and $P1b$. The method also includes the UE using $Pn1$ to determine whether or not to include in the beam report an identifier for identifying the first TRP TX beam.

12 Claims, 9 Drawing Sheets

(51) Int. Cl.
*H04B 7/0404* (2017.01)
*H04L 5/00* (2006.01)

(58) Field of Classification Search
CPC ... H04B 7/0417; H04B 7/0639; H04L 5/0051; H04L 5/0073
See application file for complete search history.

(56) References Cited

U.S. PATENT DOCUMENTS

| | | |
|---|---|---|
| 2018/0351630 A1 | 12/2018 | Nilsson et al. |
| 2019/0297603 A1* | 9/2019 | Guo .................... H04W 72/046 |
| 2021/0160850 A1* | 5/2021 | Akkarakaran ........ H04W 76/23 |
| 2021/0167821 A1* | 6/2021 | Chen .................... H04B 7/0408 |
| 2021/0321267 A1* | 10/2021 | Kim ..................... H04B 7/0408 |
| 2021/0336333 A1* | 10/2021 | Yang ........................ H01Q 3/24 |

OTHER PUBLICATIONS

IPRP issued in International Application No. PCT/EP2019/082167 dated Oct. 28, 2020 (13 pages).
NTT DOCOMO, Inc., "Discussion on multi-beam enhancement", 3GPP TSG RAN WG1 Meeting #94bis, R1-1811349, Chengdu, China, Oct. 2018 (11 pages).

\* cited by examiner

METHODS AND APPARATUSES FOR SELECTING THE BEST TRANSMIT BEAMS

CROSS REFERENCE TO RELATED APPLICATIONS

This application is a 35 U.S.C. § 371 National Stage of International Patent Application No. PCT/EP2019/082167, filed Nov. 21, 2019, designating the United States and claiming priority to U.S. provisional application No. 62/790,704, filed on Jan. 10, 2019. The above-identified applications are incorporated by reference.

TECHNICAL FIELD

This disclosure relates to a user equipment (UE) that is configured to select a set of one or more transmission point (TRP) transmit (TX) beams.

BACKGROUND

Narrow beam transmission and reception schemes will be needed at higher frequencies to compensate for high propagation loss. A suitable TRP TX beam for a UE being served by the TRP is expected to be discovered and monitored by the TRP using measurements on downlink reference signals (RSs) used for beam management, i.e., CSI-RS or SSB (CSI-RS and SSB have been agreed in 3GPP to be used as beam reference signal for New Radio (NR)). The CSI-RS for beam management can be transmitted periodically, semi-persistently or aperiodically (event triggered) and they can be either shared between multiple UEs or be UE-specific. The SSB are transmitted periodically and are shared for all UEs. In order to find a suitable TRP beam the TRP transmits CSI-RS/SSB in different TRP TX beams on which the UE performs Reference Signal Received Power (RSRP) measurements and reports back the N best TRP TX beams and their corresponding RSRP value (N greater than or equal to 1, N can be configured by the network).

There are basically three different implementations of beamforming, both at the TRP and at the UE: i) analog beamforming, 2) digital beamforming, and 3) hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming.

One example of analog/hybrid beamforming antenna architecture that has been agreed to study in 3GPP for the New Radio (NR) access technology in 5G is the concept of antenna panels. An antenna panel is an antenna arrangement that consists of or comprises a rectangular antenna array of dual-polarized antenna elements with typically one transmit/receive unit (TXRU) per polarization. An analog distribution network with phase shifters is used to steer the beam of each panel. Multiple panels can be stacked next to each other and digital beamforming can be performed across the panels. FIG. 2 illustrates two examples with two panels each (two-dimensional panels to the left and one-dimensional panels to the right), where each panel is connected to one TXRU per polarization.

SUMMARY

Different antenna arrangements (e.g., panels) at the UE might experience different amount of inter-cell interference, which means that the best TRP beam w.r.t. RSRP might not be the best TRP beam with respect to signal-to-interference-plus-noise ratio (SINR). But the standard forces the UE to report the N best TRP beams with respect to RSRP which means that the UE might need to report back a sub-optimal TRP beam with respect to SINR (and hence user throughput).

Accordingly, to overcome this problem, when a TRP performs a TRP beam sweep for a multi-antenna (e.g., multi-panel) UE, the UE takes inter-cell interference into account when selecting the N best TRP beams. For example, the measured RSRP from a first antenna arrangement (e.g., antenna panel or single antenna) that experiences more inter-cell interference than the a second antenna arrangement is weighted less compared to the RSRP measured from the second antenna arrangement that experiences lower inter-cell interference.

Thus, in one aspect there is provided a method performed by a UE for selecting one or more TX beams to identify in a beam report, where the UE comprises a plurality of antenna arrangements, including a first antenna arrangement (e.g., a single antenna, an antenna panel) and a second antenna arrangement. The method includes the UE obtaining i) a first interference value, Ia, associated with the first antenna arrangement and ii) a second interference value, Ib, associated with the second antenna arrangement. Ia and Ib may be inter-cell interference values, intra-cell interference values or a combination of inter-cell and intra-cell interference values. The method also includes the UE obtaining i) a power value, P1a, associated with the first antenna arrangement and with a first TRP TX beam and ii) a power value, P1b, associated with the second antenna arrangement and with the first TRP TX beam. The method further includes the UE determining a first final power value, Pn1, based on Ia and Ib and based on at least one of P1a, and P1b. The method also includes the UE using Pn1 to determine whether or not to include in the beam report an identifier (e.g., CRI) for identifying the first TRP TX beam.

In another aspect a computer program is provided. The computer program includes instructions which, when executed by processing circuitry, causes the processing circuitry to perform the above described method. In another aspect a carrier containing the computer program is provided, wherein the carrier is one of an electronic signal, an optical signal, a radio signal, and a computer readable storage medium.

The disclosure also describes a UE that is adapted to obtain a first interference value, Ia, associated with a first antenna arrangement of the UE and obtain a second interference value, Ib, associated with a second antenna arrangement of the UE. The UE is further adapted to obtain a first power value, P1a, associated with the first antenna arrangement and with a first TRP TX beam and obtain a second power value, P1b, associated with the second antenna arrangement and with the first TRP TX beam. The UE is also adapted to determine a first final power value, Pn1, based on Ia and Ib and based on at least one of P1a, and P1b and use Pn1 to determine whether or not to include in the beam report an identifier for identifying the first TRP TX beam. In some embodiments, the UE further comprises processing circuitry coupled to the first and second antenna arrangements; and a memory containing instructions executable by said processing circuitry for configuring the UE to perform the above described method.

A significant advantage of the above described embodiment is that the N best TRP TX beams can be selected taking the UE experienced cell interference into account, which will improve the user throughput for the UE.

BRIEF DESCRIPTION OF THE DRAWINGS

The accompanying drawings, which are incorporated herein and form part of the specification, illustrate various embodiments.

DETAILED DESCRIPTION

Figure 1:
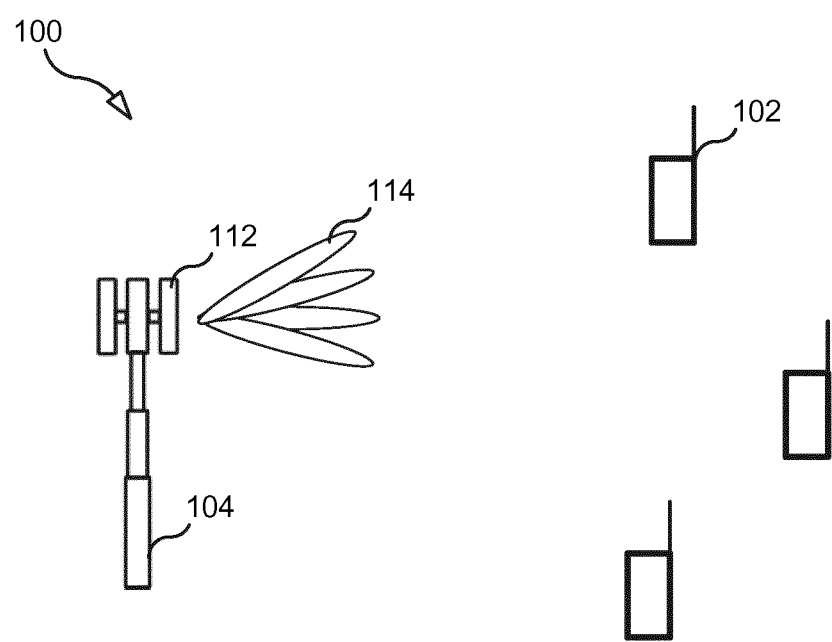
FIG. 1 illustrates a communication system according to an embodiment.
Figure 2A:
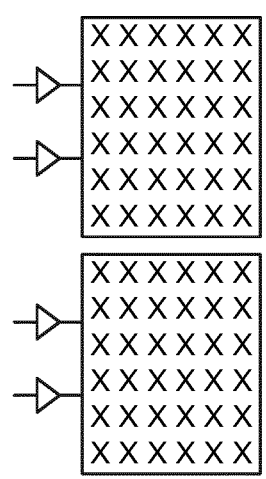
FIG. 2A illustrates two two-dimensional antenna panels.
Figure 2B:
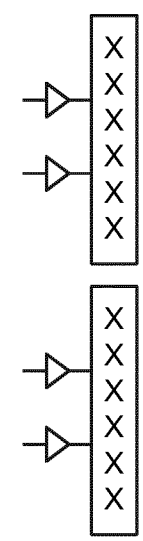
FIG. 2B illustrates two one-dimensional antenna panels.

FIG. 1 illustrates a communication system 100 according to an embodiment. Communication system 100 comprises a TRP 104 (e.g., a base station or a portion of a base station) having an antenna arrangement 112 (e.g., an antenna panel) for communicating with a set of UEs, including UE 102. As illustrated in FIG. 1, TRP 104 may employ a set of narrow TX beams, including TX beam 114, to communicate with the UEs. As noted above, narrow beam transmission and reception schemes will be needed at higher frequencies to compensate for high propagation loss.

Figure 3:
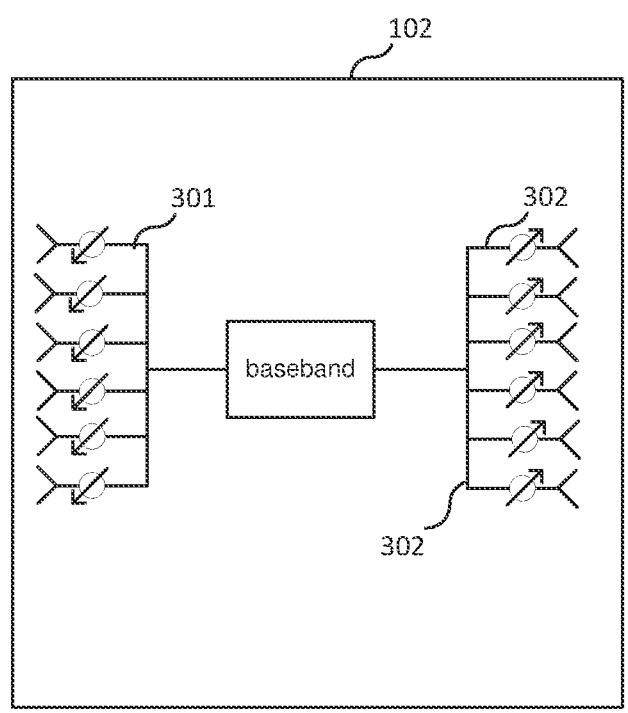
FIG. 3 illustrates a UE with two antenna panels.
Figure 4:
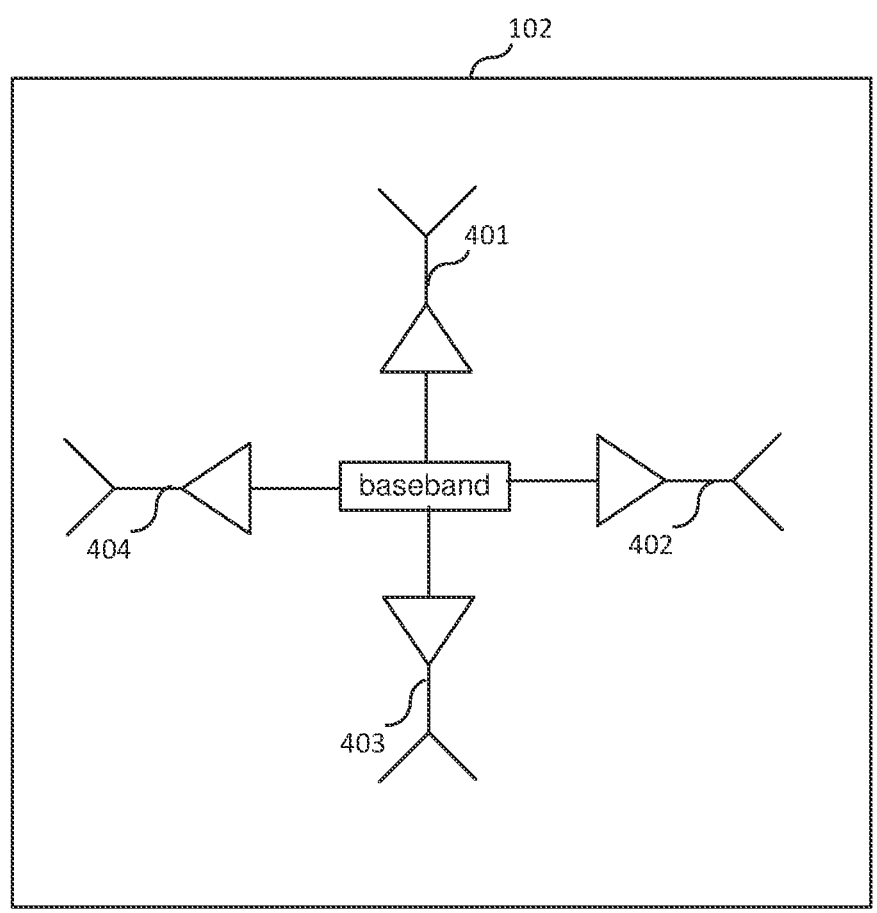
FIG. 4 illustrates a UE having directional antennas pointing in different directions.

For UE 102 (as well as for any of the other UEs), incoming signals can arrive from many different directions, hence it is beneficial to have an antenna implementation at UE 102 which has the possibility to generate omni-directional-like coverage in addition to the high gain narrow beams. One way to increase the omni-directional coverage at UE 102 is to install multiple panels, and point the panels in different directions, as schematically illustrated in FIG. 3, which shows UE 102 having with two panels (panel 301 and panel 302). It is also possible that a UE is not equipped with analog panels, but, for example, instead has directional antennas pointing in different directions as schematically illustrated in FIG. 4, which shows UE 102 having four antennas (401, 402, 403, and 404) pointing in different directions.

As noted above, different antenna arrangements (e.g., panels) at a UE might experience different amount of inter-cell interference, which means that the best TRP beam w.r.t. RSRP might not be the best TRP beam with respect to signal-to-interference-plus-noise ratio (SINR). The current 5G standard, however, requires that the UE report the N best TRP beams with respect to RSRP, which means that the UE might report back a sub-optimal TRP beam with respect to SINR (and hence user throughput).

Figure 5:
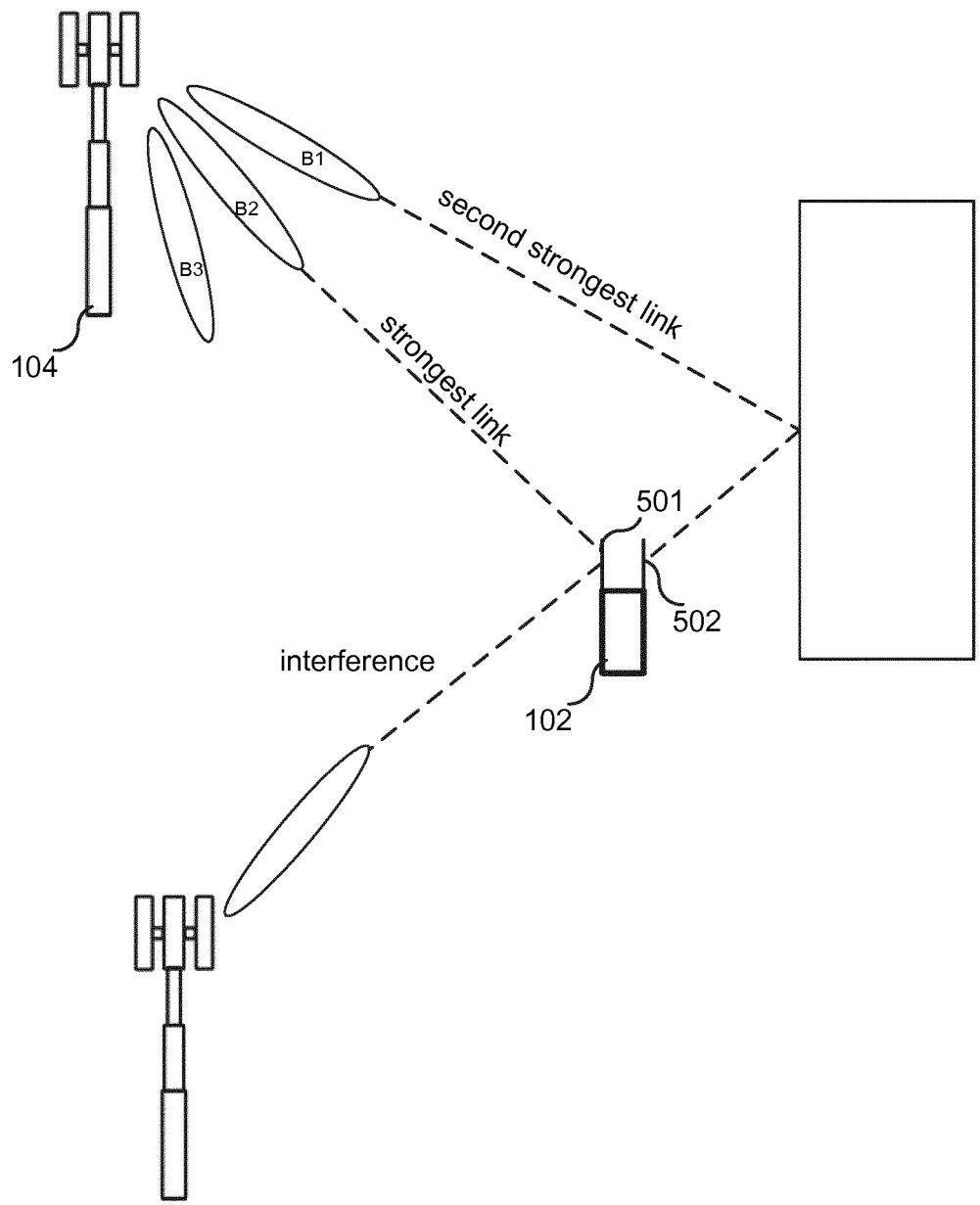
FIG. 5 illustrates a UE being equipped with two directional antennas pointing in different directions.

One example of such problem is illustrated in FIG. 5, where UE 102 is equipped with at least two antenna arrangements (antenna arrangement 501 and antenna arrangement 502) pointing in different directions. In this case, UE 102 will receive the strongest RSRP in antenna arrangement 501 from TRP beam2 (B2) since it is the strongest beam pair link (BPL), and UE 102 therefore has to report B2 as the best TRP TX beam. However, UE 102 receives strong inter-cell interference with antenna arrangement 501, hence the DL SINR is better for second strongest BPL (i.e., the BPL consisting of TX beam B1 and the RX beam used with antenna arrangement 502, and hence it would have been better w.r.t. user throughput that UE 102 reported B1 as the best TRP TX beam.

Accordingly, to overcome this problem, UE 102 is configured to take inter-cell interference into account when selecting the N best TRP beams used in a beam sweep procedure (e.g., a so-called "P2" beam sweep as is known in the art). For example, in the scenario illustrated in FIG. 5, UE 102 will: 1) use arrangement 501 to measure RSRP of an RS transmitted by TRP 102 using a TX beam (e.g., beam B2) (i.e., transmitted on a particular CSI-RS resource) to thereby produce a first RSRP measure corresponding to the TX beam, 2) use arrangement 502 to measure RSRP of an RS transmitted by TRP 102 using the same TX beam (e.g., beam B2) to thereby produce a second RSRP measure corresponding to the TX beam, and 3) weight the first RSRP measure less than the second RSRP measure to determine a final RSRP measure corresponding to the TRP TX beam (e.g., beam B2). UE 102 will perform these steps for the other TRP TX beams, thereby obtaining a set of final RSRP values (i.e., one RSRP value for each TRP TX beam used in the beam sweep). An advantage of this is that the N best TRP TX beams can be selected taking the UE 102 experienced inter-cell interference into account, which will improve the user throughput for UE 102.

Figure 6:
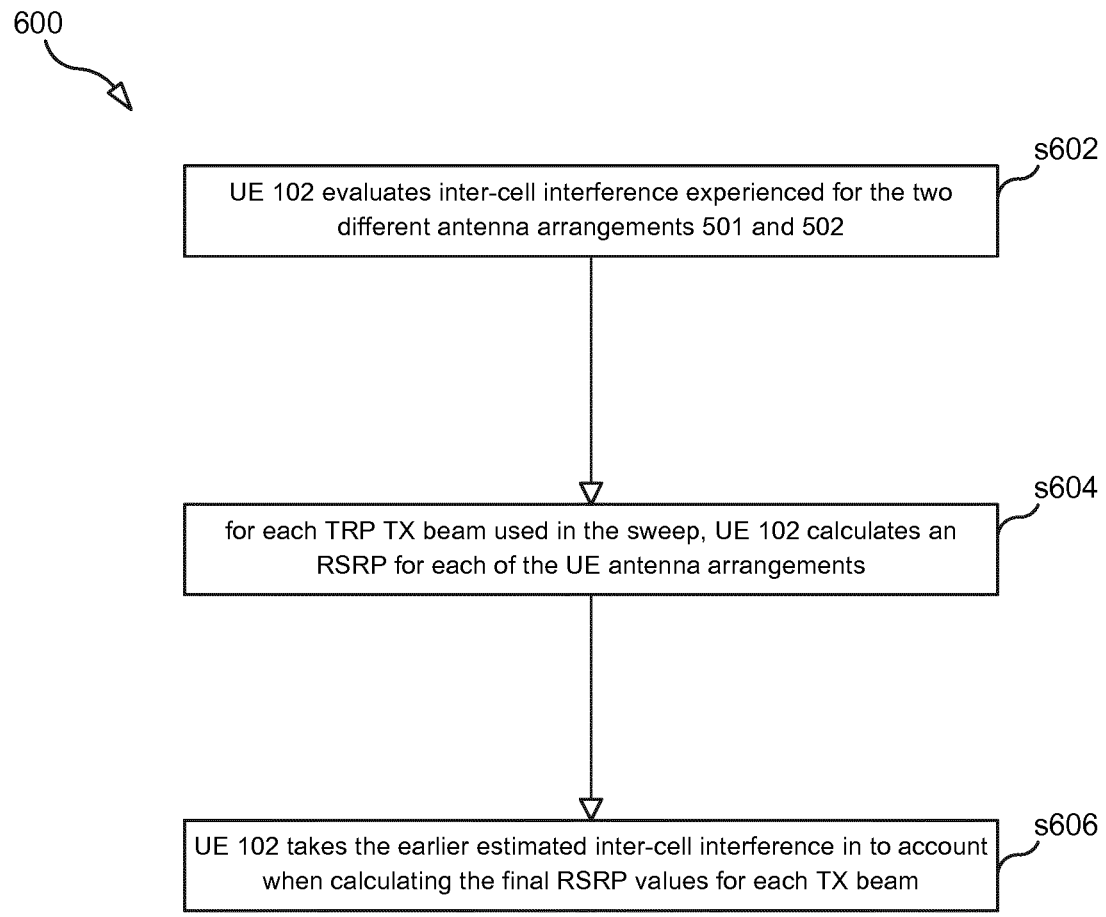
FIG. 6 is a flow chart illustrating a process according to an embodiment.

FIG. 6 is a flow chart illustrating a process 600, according to an embodiment, that is performed by UE 102, which in this example is equipped as shown in FIG. 5 (i.e., UE 102 has two different antenna arrangements pointed in different directions.

In step s602 UE 102 evaluates interference (e.g., inter-cell interference) experienced for the two different antenna arrangements 501 and 502. This could for example be done during normal CSI acquisition or beam refining procedures, where the UE not only estimates the channel from the CSI-RS transmitted from serving TRP 104, but at the same time measures or estimates the received interference.

For instance, in an embodiment, an interference estimate may be attained by calculating the residuals from the CSI-RS channel estimation, by subtracting averaged channel estimates from raw channel estimates. It may also be based on RRM measurements on SSBs from serving and neighboring cells.

In another embodiment, TRP 104 informs UE 102 that it does not intend to transmit anything for a number of OFDM symbols, allowing the UE to perform inter-cell interference measurements capturing only inter-cell interference. In this case, since there is no reference signal transmitted, the UE cannot perform an RSRP measurement and may instead perform an RSSI-like measurement, simply measuring the linear average of the received transmission power over the REs in the OFDM symbol The information that the TRP does not intend to transmit anything for one or several OFDM symbols may be conveyed for instance as a configuration of a special kind of measurement gap, but where the UE is not instructed to perform an inter-frequency or inter-RAT measurement.

Alternatively, the TRP may configure certain resources as reserved similarly as for reserved resources for LTE-NR coexistence. Yet another option is to configure the OFDM symbols with zero-power (ZP) CSI-RS resources. Another alternative is to explicitly indicate that certain OFDM symbols is to be used by the UE for inter-cell interference measurements.

Regardless of what method is used for inter-cell interference estimation, the inter-cell interference measurements may be performed multiple times over a certain time span in order to attain more statistically reliable results.

TRP 104 performs a P2 beam sweep. Accordingly, in step s604, for each TRP TX beam used in the sweep, the UE calculates an RSRP for each of the UE antenna arrangements. Thus, for each TRP TX beam used during the beam sweep, the UE will obtain M RSRP values, where M is the number of antenna arrangements at the UE.

A conventional UE would calculate the linear average of these M RSRP values (i.e., one value for each antenna arrangement per TX beam) to get the final RSRP value corresponding to the TRP TX beam. As noted previously, this might lead to sub-optimal recommendations of TRP TX beams w.r.t. SINR and user throughput.

Accordingly, in step s606, UE 102 takes the earlier estimated inter-cell interference in to account when calculating the final RSRP values for each TX beam. This is possible since it is not defined in the standard how the UE should calculate the final RSRP over multiple UE RX ports.

One way to take the inter-cell interference in to account is to weight the RSRP values of the two UE antenna arrangements differently when calculating the final RSRP value. For example, in one embodiment, the higher the inter-cell interference is for a certain UE antenna arrangements, the lower the RSRP value for that UE antenna arrangements is weighted when calculating the final RSRP. For example, the amplitude of the receiver filter weight is scaled down inversely proportional to the level of inter-cell interference. Advantageously, UE 102 will still comply with the RAN4 performance requirements and will pass the corresponding RAN4 test cases, since spatially white interference is assumed in said test cases.

For example, in one embodiment, we assume that the interference for the antenna arrangement 501 and 502 are $I_A$ and $I_B$, respectively, where $I_A$ is significantly higher than $I_B$. We further assume that the RSRP values for TRP TX beam i for the antenna arrangements 501 and 502 are $(P_A^{(i)}, P_B^{(i)})$. We further assume that due to the higher inter-cell interference experienced by arrangement 501, the best TRP beam based on RSRP and equal weighting of the two arrangements, i.e.

$$\max_i P_A^{(i)} + P_B^{(i)},$$

is different from best TRP beam based on SINR taking into account practical PDSCH receiver beamforming, i.e.

$$\max_i \frac{P_A^{(i)} + gP_B^{(i)}}{I_A + gI_B},$$

where g is a antenna receiver filter weight factor which may be proportional to the ratio between the interference level on antenna A and B, i.e.

$$g = \frac{I_A}{I_B}$$

which implies $$\max_i \frac{P_A^{(i)} + gP_B^{(i)}}{I_A + gI_B},$$

which implies $$\max_i P_A^{(i)} + \frac{I_A}{I_B} P_B^{(i)}.$$

We can then introduce corresponding weight factor for respective antenna ($w_A$, $w_B$) and we can select the weights ($w_A$, $w_B$) so that the RSRP value for the heavily interfered antenna arrangement (arrangement 501 in this example) is weighted lower compared to antenna arrangement 502 with smaller inter-cell interference. Or alternatively, use a single relative weight factor $\tilde{w}$. With the additional weight factor(s), the new final RSRP will be $(P_A^{(i)} + \tilde{w}P_B^{(i)})$. By, for example, selecting the weight such that the $$\tilde{w} = \frac{I_A}{I_B},$$

we can mimic the effect that the best beam is calculated based on SINR (taking into account PDSCH receiver filter weighting) event though it is calculated on RSRP.

In an extreme case where the interference for antenna arrangement 501 is much stronger than the interference for antenna arrangement 502, i.e. ($I_A \gg I_B$), it could be preferred to only receive the CSI-RS resources from the P2 sweep on antenna arrangement 502, i.e. ($w_A = 0$), such that the UE can choose a TRP TX beam that maximizes $P_B^{(i)}$ and not $P_A^{(i)} + P_B^{(i)}$.

Figure 7:
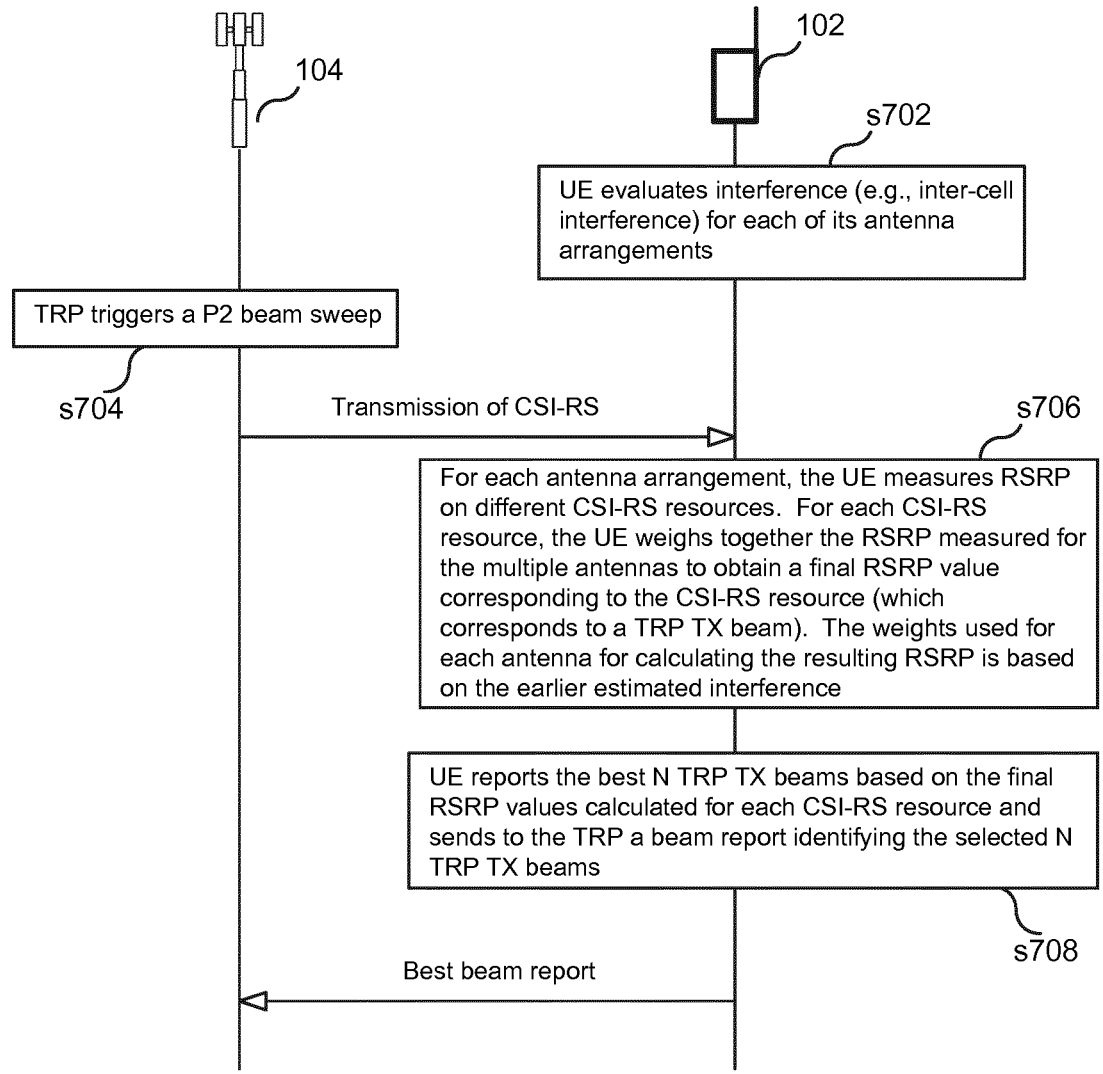
FIG. 7 is an example message flow diagram illustrating a process according to an embodiment.

FIG. 7 is a message flow diagram illustrating a process according to one embodiment. As shown in FIG. 7, UE 102 evaluates interference (e.g., inter-cell and/or intra-cell interference) experienced for the different UE antenna arrangements (e.g., antenna arrangements 501 and 502) (step s702). For example, UE 102 obtains (e.g., generates by calculating) a first interference value (Ia) associated with the antenna arrangement 501 and obtains a second interference value (Ib) associated with the antenna arrangement 502.

In step s704, the TRP performs a P2 beam sweep. That is, the TRP performs a process that includes: 1) the TRP using a first TRP TX beam to transmit CSI-RS on a first CSI-RS resource and 2) the TRP using a second TRP TX beam to transmit CSI-RS on a second CSI-RS resource. Hence, the first CSI-RS resource corresponds to the first TX beam and the second CSI-RS resource corresponds to the second TX beam.

In step s706, for each antenna arrangement 501 and 502, UE 102 measures RSRP on the different CSI-RS resources. For example, using antenna arrangement 501, UE 102 obtains a first RSRP value corresponding to a first CSI-RS resource, which corresponds to a first TRP TX beam, and obtains a second RSRP value corresponding to a second CSI-RS resource, which corresponds to a second TRP TX beam. Likewise, using antenna arrangement 502, UE 102 obtains a third RSRP value corresponding to the first CSI-RS resource and obtains a fourth RSRP value corresponding to the second CSI-RS resource.

For each CSI-RS resource, UE 102 weighs together the RSRP measured for the multiple antenna arrangements to obtain a final RSRP value corresponding to the CSI-RS resource (which corresponds to a TRP TX beam). For example, UE 102 may use the first and second RSRP values and weight values to calculate a first final RSRP value corresponding to the first CSI-RS resource—e.g., first final RSRP value=(wa)(first RSRP value)+(wb)(second RSRP value), where wa is greater than or equal to 0 and wb is greater than or equal to 0. The weights (wa, wb) used for calculating the resulting RSRP is based on the earlier estimated interference. In this way, UE 102 takes interference in to account for the different antenna arrangements when calculating the resulting (final) RSRP for each TRP TX beam (for example as described above).

In step s708, UE 102 transmits a beam report (a.k.a., "best beam report") that includes the CSI-RS Resource Indicator(s) (CRI(s)) indicating the CSI-RS resources corresponding to the best N TRP TX beam(s) based on the new calculated RSRP values. In this way, UE 102 reports back to the TRP the N best TRP TX beams. The corresponding final RSRP values may also be included in the beam report.

In one embodiment, UE 102 considers intra-cell interference instead of (or in addition to) inter-cell interference. For example, UE 102 might detect that that the serving cell often generates strong intra-cell interference to a certain antenna arrangement (e.g., arrangement 502). For example, the TRP might transmit pairwise MU-MIMO transmission to two UEs. The proposed invention will work in the same way for intra-cell interference as was describe for inter-cell interference above.

Figure 8:
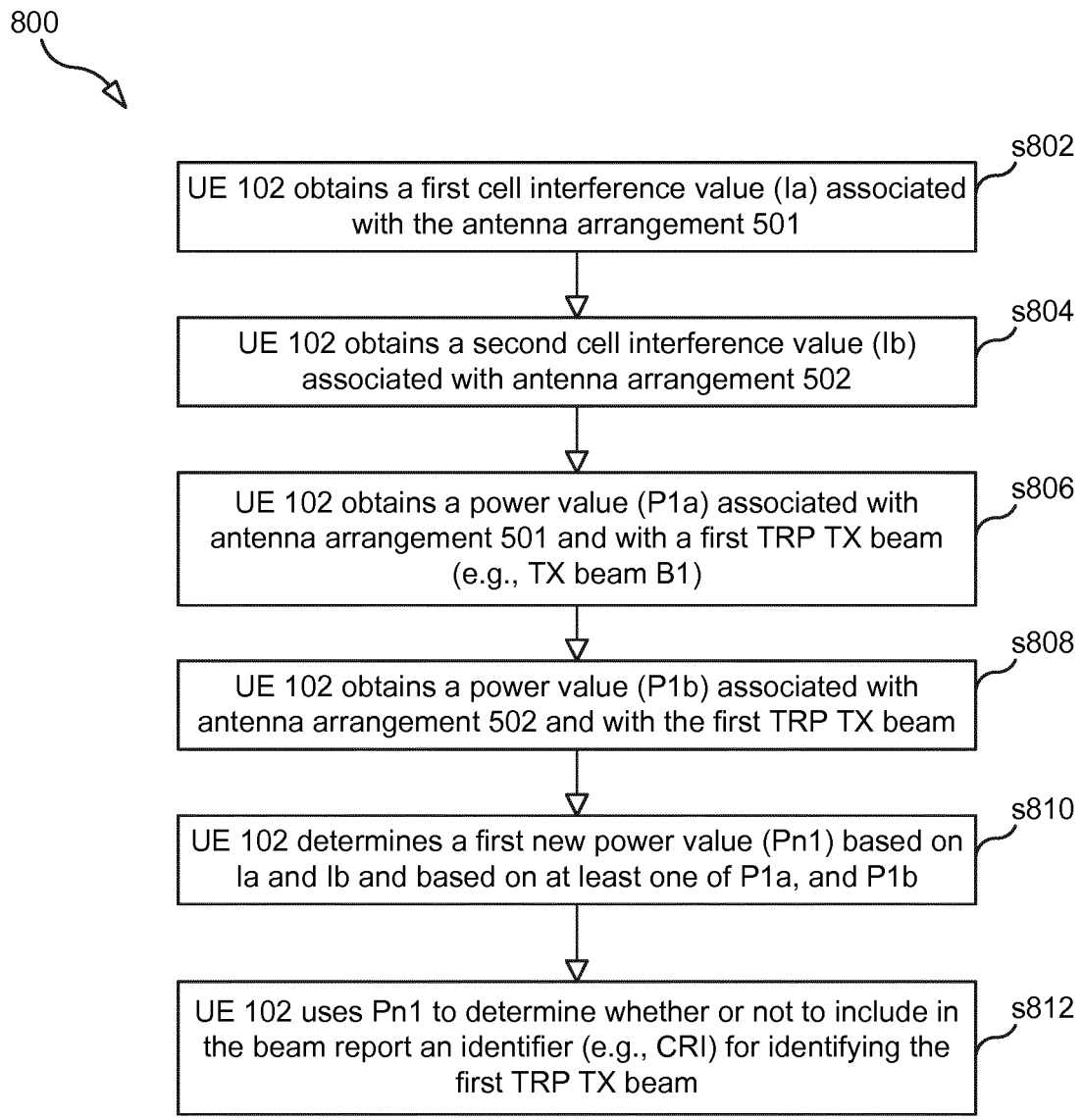
FIG. 8 is a flow chart illustrating a process according to an embodiment.

FIG. 8 is a flowchart illustrating a process 800, according to an embodiment, that is performed by UE 102 for selecting one or more TX beams to identify in a beam report. Process 800 may begin in step s802. Step s802 comprises UE 102 obtaining a first interference value (Ia) associated with the antenna arrangement 501. Step s804 comprises UE 102 obtaining a second interference value (Ib) associated with antenna arrangement 502. Step s806 comprises UE 102 obtaining a power value (P1a) associated with antenna arrangement 501 and with a first TRP TX beam (e.g., TX beam B1). Step s808 comprises UE 102 obtaining a power value (P1b) associated with antenna arrangement 502 and with the first TRP TX beam. Step s810 comprises UE 102 determining a first final power value (Pn1) based on Ia and Ib and based on at least one of P1a, and P1b. Step s812 comprises UE 102 using Pn1 to determine whether or not to include in the beam report an identifier (e.g., CRI) for identifying the first TRP TX beam.

In some embodiments, determining the first final power value comprises calculating: $Pn1=(wa)(P1a)+(wb)(P1b)$, wherein wa is a function of at least Ia and wb is a function of at least Ib.

In some embodiments, determining the first final power value comprises calculating: $Pn1=P1a+wP1b$, wherein $w=Ia/Ib$.

In some embodiments, determining the first final power value comprises: determining whether Ia>>Ib; and if Ia>>Ib, then determining Pn1 comprises setting Pn1 equal to Pb. Determining whether Ia>>Ib consists of determining whether Ia−Ib is greater than a threshold.

In some embodiments, obtaining P1a comprises the UE receiving, via the first antenna arrangement, a reference signal transmitted by a TRP, wherein the TRP used the first TRP TX beam to transmit the reference signal.

In some embodiments, the method also includes the UE obtaining a power value, P2a, associated with the first antenna arrangement and with a second TRP TX beam; the UE obtaining a power value, P2b, associated with the second antenna arrangement and with the second TRP TX beam; and the UE determining a second final power value, Pn2, based on Ia and Ib and based on at least one of P2a, and P2b. In some embodiments, using Pn1 to determine whether or not to include in the beam report the identifier for identifying the first TRP TX beam comprises determining whether Pn1 is greater than Pn2. In some embodiments, the method also comprises including in the beam report the identifier for identifying the first TRP TX beam as a result of determining that Pn1 is greater than each final power value included in a set of final power values, wherein the set of final power values comprises Pn2. In some embodiments, the method also comprises including in the beam report a Reference Signal Received Power (RSRP) value corresponding to the identifier for identifying the first TRP TX beam, wherein the RSRP value is equal to Pn1.

In some embodiments, the first antenna arrangement comprises: i) a single antenna or ii) a plurality of antennas (e.g., an antenna panel).

In some embodiments, obtaining the first interference value comprises: i) obtaining a first inter-cell interference value or ii) obtaining a first intra-cell interference value, and obtaining the second interference value comprises: i) obtaining a second inter-cell interference value or ii) obtaining a second intra-cell interference value.

In some embodiments, obtaining the first interference value comprises calculating the first interference value using the first inter-cell interference value and the first intra-cell interference value, and obtaining the second interference value comprises calculating the second interference value using the second inter-cell interference value and the second intra-cell interference value.

As demonstrated above, when a TRP performs a TRP beam sweep for a multi-antenna arrangement (e.g., multi-panel) UE, the UE takes inter-cell interference in to account during RSRP calculations for the different TRP beams such that the RSRP from an antenna arrangement that experience more inter-cell interference is weighted less compared to the RSRP measured from an antenna arrangement that experiences lower inter-cell interference.

Figure 9:
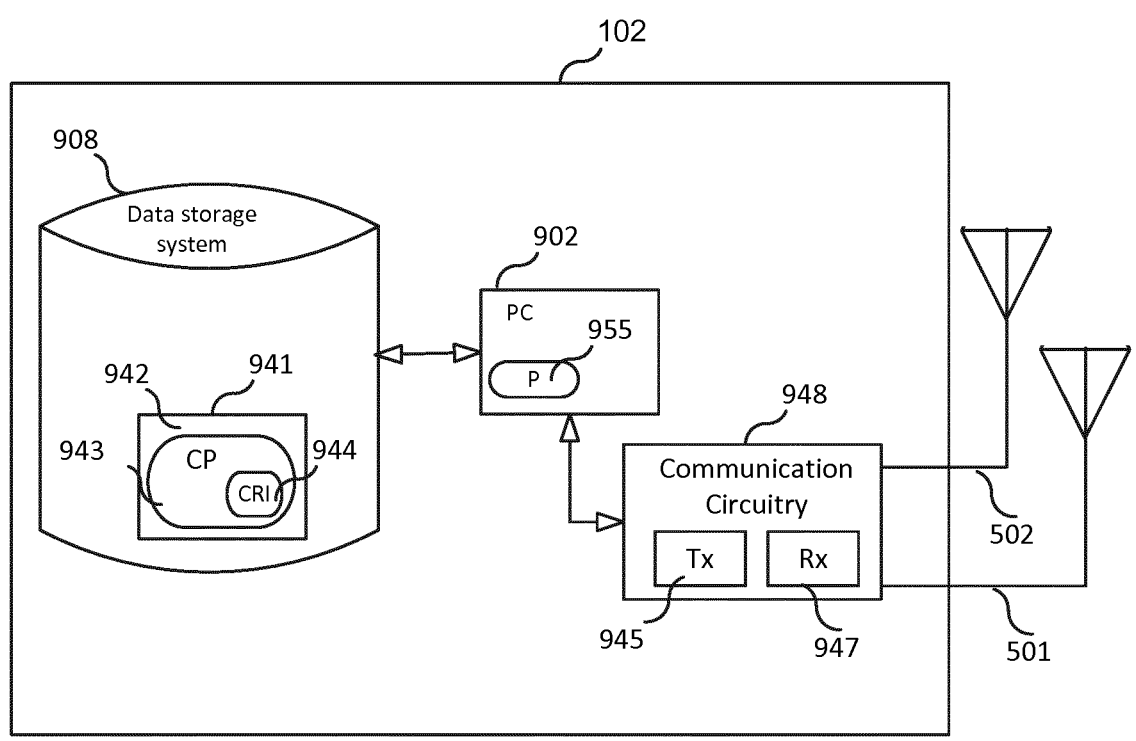
FIG. 9 is a block diagram of an apparatus according to one embodiment.

FIG. 9 is a block diagram of UE 102, according to some embodiments. As shown in FIG. 9, UE 102 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like); communication circuitry 948, which is coupled to antenna arrangement antenna arrangement 501 and antenna arrangement 502 and which comprises a transmitter (Tx) 945 and a receiver (Rx) 947 for enabling UE 102 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes UE 102 to perform steps described herein (e.g., steps described herein with reference to the flow charts). In other embodiments, UE 102 may be configured to perform steps described herein without the need for code. That is, for example, PC 902 may consist merely of one or more ASICs. Hence, the features of the embodiments described herein may be implemented in hardware and/or software.

SUMMARY OF VARIOUS EMBODIMENTS

A1. A method (800) performed by a user equipment, UE (102), for selecting one or more TX beams to identify in a beam report, wherein the UE comprises a plurality of antenna arrangements, including a first antenna arrangement and a second antenna arrangement, the method comprising: the UE obtaining a first interference value, Ia, associated with the first antenna arrangement; the UE obtaining a second interference value, Ib, associated with the second antenna arrangement; the UE obtaining a power value, P1$a$, associated with the first antenna arrangement and with a first TRP TX beam; the UE obtaining a power value, P1$b$, associated with the second antenna arrangement and with the first TRP TX beam; the UE determining a first final power value, Pn1, based on Ia and Ib and based on at least one of P1$a$, and P1$b$; and the UE using Pn1 to determine whether or not to include in the beam report an identifier (e.g., a CRI) for identifying the first TRP TX beam.

A2. The method of embodiment A1, wherein determining the first final power value comprises calculating: Pn1=(wa)(P1$a$)+(wb)(P1$b$), wherein wa is a function of at least Ia and wb is a function of at least Ib.

A3. The method of embodiment A1, wherein determining the first final power value comprises calculating: Pn1=P1$a$+wP1$b$, wherein w=Ia/Ib.

A4. The method of embodiment A1, wherein determining the first final power value comprises: determining whether Ia>>Ib; and if Ia>>Ib, then determining Pn1 comprises setting Pn1 equal to Pb.

A5. The method of any one of embodiments A1-A4, wherein obtaining P1$a$ comprises the UE receiving, via the first antenna arrangement, a reference signal transmitted by a TRP, wherein the TRP used the first TRP TX beam to transmit the reference signal.

A6. The method of any one of embodiments A1-A5, further comprising: the UE obtaining a power value, P2$a$, associated with the first antenna arrangement and with a second TRP TX beam; the UE obtaining a power value, P2$b$, associated with the second antenna arrangement and with the second TRP TX beam; and the UE determining a second final power value, Pn2, based on Ia and Ib and based on at least one of P2$a$, and P2$b$.

A7. The method of embodiment A6, wherein using Pn1 to determine whether or not to include in the beam report the identifier for identifying the first TRP TX beam comprises determining whether Pn1 is greater than Pn2.

A8. The method of embodiment A7, further comprising including in the beam report the identifier for identifying the first TRP TX beam as a result of determining that Pn1 is greater than each final power value included in a set of final power values, wherein the set of final power values comprises Pn2.

A9. The method of embodiment A8, further comprising including in the beam report a Reference Signal Received Power (RSRP) value corresponding to the identifier for identifying the first TRP TX beam, wherein the RSRP value is equal to Pn1.

A10. The method of any one of embodiments A1-A9, wherein the first antenna arrangement comprises: i) a single antenna or ii) a plurality of antennas (e.g., an antenna panel).

A11. The method of any one of embodiments A1-A10, wherein obtaining the first interference value comprises: i) obtaining a first inter-cell interference value or ii) obtaining a first intra-cell interference value, and obtaining the second interference value comprises: i) obtaining a second inter-cell interference value or ii) obtaining a second intra-cell interference value.

A12. The method of embodiment A11, wherein obtaining the first interference value comprises calculating the first interference value using the first inter-cell interference value and the first intra-cell interference value, and obtaining the second interference value comprises calculating the second interference value using the second inter-cell interference value and the second intra-cell interference value.

B1. A user equipment, UE (102), the UE being configured to: obtain a first interference value, Ia, associated with the first antenna arrangement; obtain a second interference value, Ib, associated with the second antenna arrangement; obtain a power value, P1$a$, associated with the first antenna arrangement and with a first TRP TX beam; obtain a power value, P1$b$, associated with the second antenna arrangement and with the first TRP TX beam; determine a first final power value, Pn1, based on Ia and Ib and based on at least one of P1$a$, and P1$b$; and use Pn1 to determine whether or not to include in the beam report an identifier (e.g., a CRI) for identifying the first TRP TX beam.

B2. The UE of embodiment B1, wherein the UE is further configured to perform the method of any one of embodiments A2-A12.

C1. A computer program comprising instructions for adapting an apparatus to perform the method of any one of embodiments A1-A11.

C2. A carrier containing the computer program of embodiment C1, wherein the carrier is one of an electronic signal, optical signal, radio signal, or compute readable storage medium.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE) for selecting one or more transmit (TX) beams to identify in a beam report, wherein the UE comprises a plurality of antenna arrangements, including a first antenna arrangement and a second antenna arrangement, the method comprising:
the UE obtaining a first interference value, Ia, associated with the first antenna arrangement;
the UE obtaining a second interference value, Ib, associated with the second antenna arrangement;
the UE obtaining a power value, P1$a$, associated with the first antenna arrangement and with a first TRP TX beam;

the UE obtaining a power value, P1b, associated with the second antenna arrangement and with the first TRP TX beam;

the UE determining a first final power value, Pn1, based on Ia and Ib and based on at least one of P1a, and P1b; and the UE using Pn1 to determine whether or not to include in the beam report an identifier for identifying the first TRP TX beam, wherein determining the first final power value comprises calculating: Pn1=(wa)(P1a)+(wb)(P1b), wherein wa is a function of at least Ia and wb is a function of at least Ib, or determining the first final power value comprises calculating: Pn1=P1a+wP1b, wherein w=Ia/Ib.

2. The method of claim 1, wherein determining the first final power value comprises:

determining whether Ia is much greater than Ib; and as a result of determining that Ia is much greater than Ib, setting Pn1 equal to P1b.

3. The method of claim 1, wherein obtaining P1a comprises the UE receiving, via the first antenna arrangement, a reference signal transmitted by a TRP, wherein the TRP used the first TRP TX beam to transmit the reference signal.

4. The method claim 1, further comprising:

the UE obtaining a power value, P2a, associated with the first antenna arrangement and with a second TRP TX beam;

the UE obtaining a power value, P2b, associated with the second antenna arrangement and with the second TRP TX beam; and the UE determining a second final power value, Pn2, based on Ia and Ib and based on at least one of P2a, and P2b.

5. The method of claim 4, wherein using Pn1 to determine whether or not to include in the beam report the identifier for identifying the first TRP TX beam comprises determining whether Pn1 is greater than Pn2.

6. The method of claim 5, further comprising including in the beam report the identifier for identifying the first TRP TX beam as a result of determining that Pn1 is greater than each final power value included in a set of final power values, wherein the set of final power values comprises Pn2.

7. The method of claim 6, further comprising including in the beam report a Reference Signal Received Power (RSRP) value corresponding to the identifier for identifying the first TRP TX beam, wherein the RSRP value is equal to Pn1.

8. The method claim 1, wherein the first antenna arrangement comprises: i) a single antenna or ii) a plurality of antennas.

9. The method claim 1, wherein obtaining the first interference value comprises: i) obtaining a first inter-cell interference value or ii) obtaining a first intra-cell interference value, and obtaining the second interference value comprises: i) obtaining a second inter-cell interference value or ii) obtaining a second intra-cell interference value.

10. The method of claim 9, wherein obtaining the first interference value comprises calculating the first interference value using the first inter-cell interference value and the first intra-cell interference value, and obtaining the second interference value comprises calculating the second interference value using the second inter-cell interference value and the second intra-cell interference value.

11. A computer program product comprising a non-transitory computer readable medium storing a computer program comprising instructions which when executed by processing circuitry causes the processing circuitry to perform the method claim 1.

12. A user equipment (UE), the UE comprising:

a first antenna arrangement;

a second antenna arrangement;

processing circuitry coupled to the first and second antenna arrangements, wherein the UE is adapted to:

obtain a first interference value, Ia, associated with the first antenna arrangement of the UE;

obtain a second interference value, Ib, associated with the second antenna arrangement of the UE;

obtain a power value, P1a, associated with the first antenna arrangement and with a first TRP TX beam;

obtain a power value, P1b, associated with the second antenna arrangement and with the first TRP TX beam;

determine a first final power value, Pn1, based on Ia and Ib and based on at least one of P1a, and P1b; and use Pn1 to determine whether or not to include in a beam report an identifier for identifying the first TRP TX beam, wherein the UE is adapted to determine the first final power value by calculating: Pn1=(wa)(P1a)+(wb)(P1b), wherein wa is a function of at least Ia and wb is a function of at least Ib, or the UE is adapted to determine the first final power value by calculating: Pn1=P1a+wP1b, wherein w=Ia/Ib.

* * * * *